INVENTOR.
GERHARDT C. ROWE
BY
Peter F. Willig
ATTORNEY

INVENTOR
GERHARDT C. ROWE
BY Peter J. Willig
ATTORNEY

Dec. 9, 1969 G. C. ROWE 3,482,316

MAGNETIC TAPE GAGE

Filed March 8, 1965 3 Sheets-Sheet 3

INVENTOR.
GERHARDT C. ROWE

BY Peter F. Willig
ATTORNEY

United States Patent Office 3,482,316
Patented Dec. 9, 1969

3,482,316

MAGNETIC TAPE GAGE

Gerhardt C. Rowe, Rockville, Md., assignor to Keuffel & Esser Company, Hoboken, N.J., a corporation of New Jersey Filed Mar. 8, 1965, Ser. No. 437,692
Int. Cl. G01c *21/20;* G01b *3/14, 5/24*
U.S. Cl. 33—1 10 Claims

ABSTRACT OF THE DISCLOSURE

A distance measuring or position indicating scale is divided into regular intervals by sensible indicia which establish at each division position a binary coded decimal indication of the finite distance of the particular division from a base point. The scale in combination with a signal source reading head may be employed to indicate directly positions or distances along the scale.

This invention relates in general to position measuring devices and more particularly to the use of coded magnetic tape to provide a digital indication of position.

Distance measuring devices are known in which grooved scales are used to provide a digital indication of distance measured. These grooved scales are read by either photoelectric or electromagnetic means. There is a real limitation on both the accuracy and the precision of devices where grooved scales form the basic measuring rod. Precision is limited because of the difficulty of etching or cutting grooves as close as may be desired and highly precise equipment thus requires a very expensive manufacturing process. Accuracy is limited for the same reason in that it is very expensive and difficult to maintain the exact distance between each successive groove.

Furthermore, the prior art groove technique requires a transducer which counts the number of grooves transversed in order to give an indication of position. Where a series of positions, as when tracing a line, are to be encoded and an error is made in the count to any one position, then all successive positions will reflect that same error. In other words, a series of grooves does not permit the effective use of a position code.

Accordingly, it is one object of this invention to provide a position gage which will give an absolute digital indication of position by sensing a code that is associated with each position.

It is a further object of this invention to provide a more accurate and a more precise position gage.

It is another object of this invention to provide these above advantages in a simpler and less expensive form than hitherto available.

It is also an object of this invention to provide a position code adapted to be used with a position gage to indicate position while eliminating the necessity of having to count a large number of position units.

In brief, this invention involves the use of a multichannel coded magnetic tape as the position scale. A magnetic reading head which is linked to a stylus reads the position of the stylus in digital form from the coded tape. This digital reading may then be fed to a computer and stored. The stored data may be used for either the display of information and/or to control the path of another stylus so as to reproduce the positions or lines and curves read and traced by the original stylus.

The tape employed has seven channels so that seven bits may be read at each position along the tape. By use of a particular BCD (binary coded decimal) code, this seven channel tape can be used to measure a maximum of 99,999,999 positions. In practical terms this can mean up to 99,999.999 inches with a precision of 1/1000 of an inch. The particular novel BCD code which permits such an achievement is disclosed in detail in the description following.

Further objects and purposes of this invention will become apparent from the following detailed description and the drawings, in which.

Figures 1, 2:
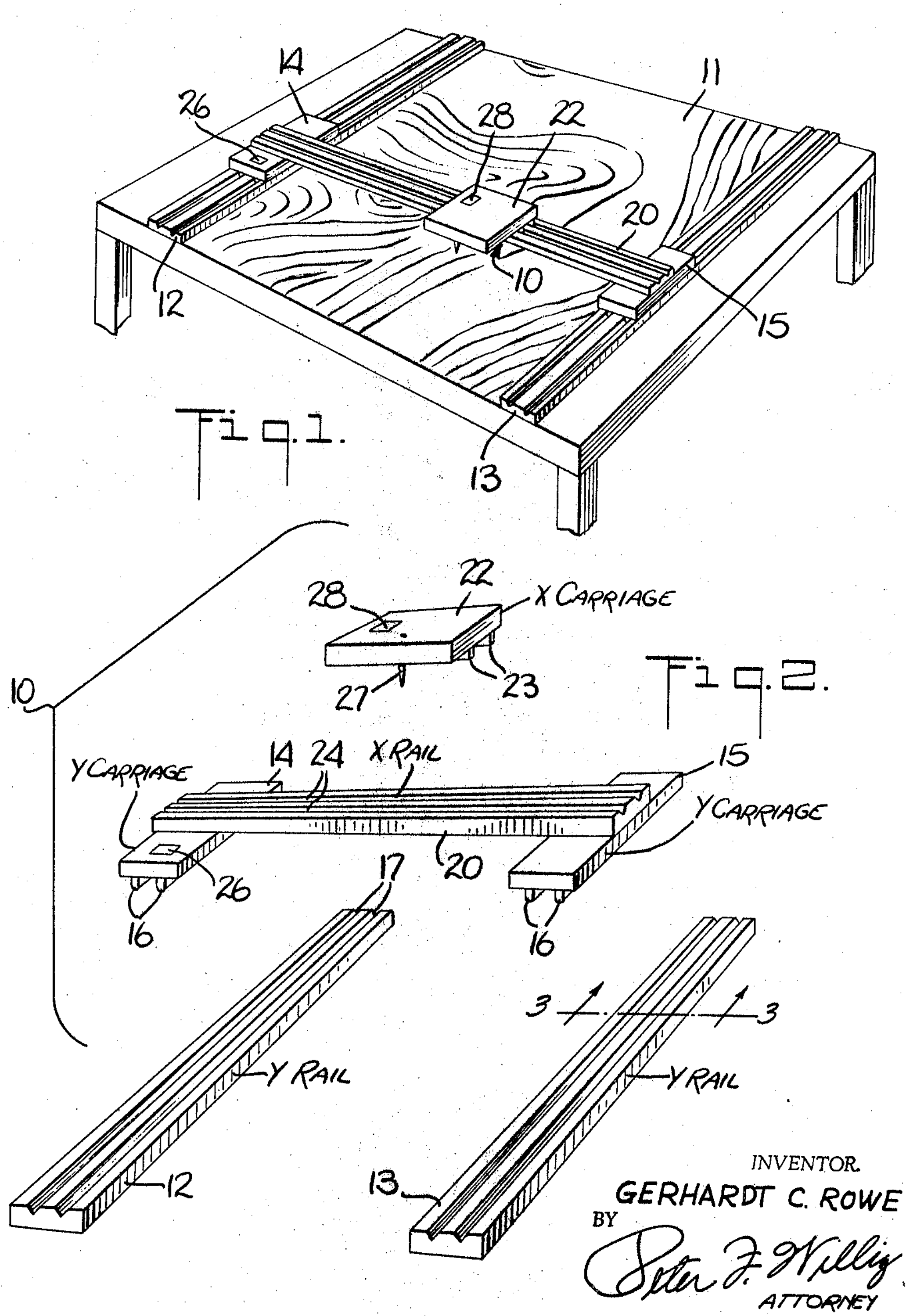
FIG. 1 is a perspective mechanical schematic of a position measuring device embodying the invention.
FIG. 2 is an exploded mechanical schematic of the position measuring device of FIG. 1.
Figure 3:
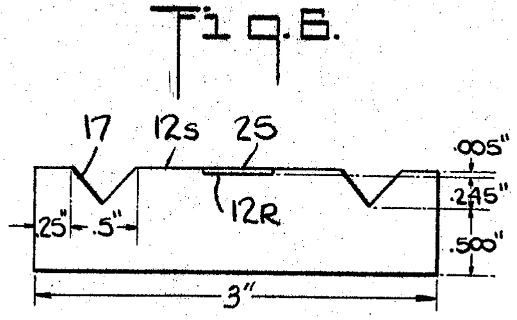
FIG. 3 is a cross-sectional view taken at the perpenedicular plane at line 3—3 of FIG. 2.

FIGS. 1, 2 and 3 illustrate, in mechanical schematic form, a position measuring device 10 for measuring positions in two dimensions. These dimensions, as is conventional, will be termed the X and Y dimensions herein. A working surface 11 is adapted to receive and hold whatever chart is to be measured or traced.

Two Y rails 12 and 13 are arranged parallel to one another and spaced apart from one another so that whatever graph or drawing is to be traced may be placed between these two Y rails 12 and 13. Two Y carriages 14 and 15 are adapted to ride on the two Y rails 12 and 13, respectively, by means of the ribs 16 which ride in the grooves 17.

An X rail 20 is rigidly attached to and spans the Y carriages 14 and 15. An X rail 20 has its major axis perpendicular to the major axis of the two Y rails 12 and 13. An X carriage 22 is adapted to ride on the X rail 20 by means of the ribs 23 which ride in the grooves 24.

As may best be seen in FIG. 3, the Y rail top surface 12S, which lies between the two grooves 17, has a small recess 12R which runs substantially the length of the rail 12. The BCD coded magnetic tape 25 is deployed along this recess 12R.

A reading head 26 is positioned in the Y carriage 14 so as to be able to read the bits encoded on the magnetic tape 25 in the recess 12R.

A similar arrangement is employed in connection with the X axis, wherein a reading head 28 is held in the X carriage 22 in such a position as to be able to read the bits encoded in a second magnetic tape that is deployed along a recess in the upper surface of the X rail 20. In this fashion the position of the reading heads 26 and 28 will read out simultaneously a Y axis position and an X axis position.

A stylus 27 may be rigidly connected to the X carriage 22. As the stylus 27 is moved over a drawing that is positioned between the two Y rails 12 and 13, the X carriage 22 and the Y carriages 14 and 15 will move in response to the movement of the stylus 27. Thus, the heads 26 and 28 will read out a position from the tapes in the rails 12 and 20, respectively, to provide an indication of the X and Y position of the stylus 27.

It might be noted that the Y rail 13 and Y carriage 15 are a dummy rail and carriage combination in that no tape is deployed in the rail 13 and no reading head is provided in the carriage 15 since the rail 12 and carriage 14 are sufficient to provide the Y readings required. It should also be noted that the construction of the X rail 20 is the same as the construction of the Y rail 12 so that FIG. 3 adequately represents both X and Y rails.

Although the illustration provided is a mechanical schematic, certain dimensions are included in FIG. 3 in order to provide a more complete picture of one particular appropriate and useful guide rail.

THE BCD CODE

Because it is the regular ten digit decimal system which is being encoded, and because it is encoded by means of a binary code, the coding method is called binary coded decimal or BCD for short. The channels labeled 8, 4, 2 and 1 are the four channels which are used for the binary code. The channels labeled A, B and C are used to encode the position of the decimal being changed.

Figure 4:
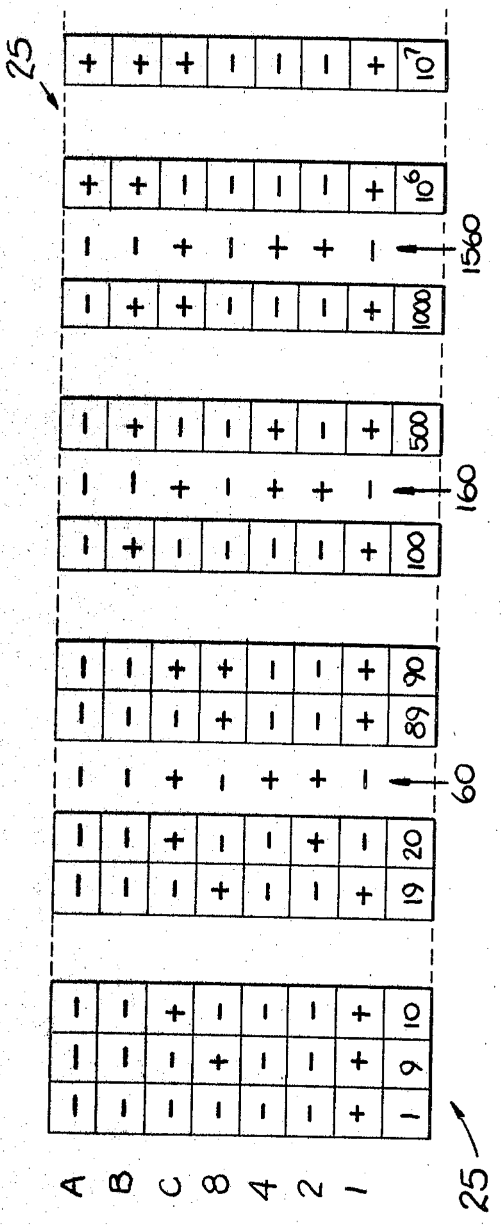
FIG. 4 is a schematic illustration of the seven channel code employed on the magnetic tape used in the device of FIG. 1.

FIG. 4 illustrates the seven channel code which is impressed on the magnetic tape and which is used to give an indication of position. A separate tape has to be used for each axis so that each tape will merely give the coordinate for the axis along which it is deployed. Thus each position in a plane is uniquely indicated by an X coordinate reading and a Y coordinate reading.

The channels labeled 8, 4, 2 and 1 are used to code, in repetitive fashion, the digits 1 through 9 in the standard binary code. Each tenth column is used to encode two pieces of information. The position of the decimal place being changed is coded in channels A, B and C while the new value of this number is encoded in the channels 8, 4, 2, 1.

As will become clear, from a further examination of FIG. 4 in connection with the description of this code, this coding technique does not mean that there will be a unique code for each position along the tape. It is only this coding technique in connection with the logical network represented by the panel lights as shown in FIG. 5 that provides a unique representation of each position along the magnetic tape.

Furthermore, in connection with the following description of this coding system, the decimal point will be ignored and it will be assumed that each position along the tape stands for a unit of one. In fact, in one embodiment, each unit along the tape may represent 1/1000 of an inch (.001 inch). However, for purposes of description, it will simplify matters to consider each position as a unit. Thus we can consider that the seven channel tape, together with the logic network and panel board, can be used to encode a maximum of 99,999,999 units.

To consider the code on the tape itself in detail and with reference to FIG. 4, the tape will start with the unit 1 encoded as shown and will proceed to the unit 9, as shown, with these units 1 through 9 being encoded in the channels 8, 4, 2 and 1 by means of the standard binary code. The unit 10 will then be encoded as shown with: (1) a bit in the channel C indicating that the next to the last digit is being affected and (2) a binary code in the 8, 4, 2, 1 channels indicating that the numeral in the next to the last digit is the numeral 1.

Figure 5:
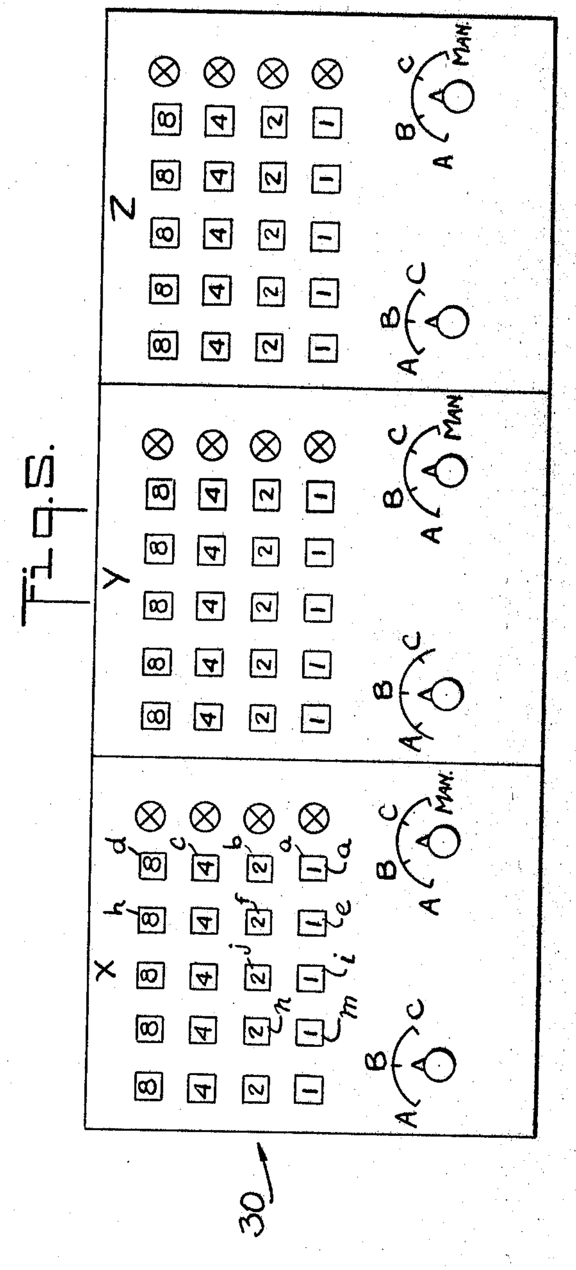
FIG. 5 is a view of the control panel required for the proper reading of the encoded tape.

The discussion of the code that's impressed on the tape, and illustrated in FIG. 4, is best understood in connection with the display panel 30 illustrated in FIG. 5. In the display panel, each little square represents an indicator light and each indicator light has the numeral 1, 2, 4 or 8 on it. When the zero position on the tape is being read, all of the indicator lights are out. When any one of the first 9 positions on the tape is being read, the light in the right hand column on the display panel lights up that corresponds to the particular bit in the 8, 4, 2, 1 channels. Thus if the position 9 is being read on the tape, the indicator lights *a* and *d* will be lit. The operator can simply add up the numerals that are lit up in order to get the proper decimal numeral equivalent.

The display panel 30 is shown having an ability to represent three tapes (presumably in three coordinates X, Y and Z). This discussion will assume that the tape 25 of FIG. 4 is the X tape and will be read on the X section of the panel 30.

When the head moves to the tenth position on the tape, two things happen: (1) the existence of a bit in one of the channels A, B or C causes all of the lights in the last (rightmost) column of the display panel 30 to go out so that the last digit becomes a zero and (2) the existence of the bit in the channel C causes lights to be lit in the second column of lights on the panel, the particular lights that are lit being determined by the location of bits in the channels 8, 4, 2, 1. Thus the numeral 10 is indicated on the display panel by the indicator light *e* being lit. As the head proceeds further along the tape, the next 9 positions will look to the head exactly the same as the first 9 positions so that, from the tape itself, it is impossible to determine whether one is in the range from 1 through 9 or in the range from 11 through 19. Accordingly, the indicator lights *a*, *b*, *c* and *d* light up in the same fashion as they did in response to the positions 1 through 9. However, the indicator light *e* remains lit and, in remaining lit, indicates to the operator (or to a computer) that the units 10 through 19 are being read.

When the head proceeds to position 20, the existence of the bit in the channel C causes all the lights on the control panel, including the light *e*, to be extinguished. At the same time the bit in the channel C dictates that a light in the second column from the right be lit; and the bit in the channel 2 determines that the light *f* be the one lit.

At this point it can be seen that the coding in the channels A, B and C determine the column of lights in the control panel which are enabled to be lit. The indicator lights in the enabled column that do light are the ones that correspond to the bits in the 8, 4, 2 and 1 channels. It should be remembered that when the channels A, B and C are all blank, that in itself is a code designation that enables the rightmost column of lights to be lit. Thus the channels A, B and C only display a bit every tenth position so that the rightmost digit can change from 1 through 9 between each tenth position.

A consideration of a few other positions on the tape will be instructive. For example, consider the position 100. At this position, a bit in the channel B enables the column of lights that is third from the right to be lit and the particular light that does light is the one *i* in the first row which corresponds to the bit in channel 1.

Every tenth position between 110 and 190 will present a bit in the channel C (for example, see position 160 illustrated). It should be noted that the existence of this bit in channel C will continue to cause all of the lights in the two rightmost columns of the display panel 30 to be extinguished but will not effect the lights in any columns to the left of these two columns so that the indicator light *i* will remain lit as the head goes from position 100 to position 199. However, at position 200, the existence of a bit in the B channel will wipe out all lights in the three rightmost columns on the panel and will concurrently enable the third column from the right which will light up with a light at the indicator light *j*.

If we now go to the position 1000, we will see that there are bits at the channels B and C, which bits correspond to the binary encoding of the numeral 3 and in this case are used to represent 103 and thereby enable the fourth column of lights from the right. In addition, the existence of a bit in the channel B wipes out all the lights in the first three columns on the right. The indicator light *m* will light corresponding to the bit in the channel 1 at the position 1000.

Between the position 1001 and the position 1999, there will be no recurrence of the bit in the channel B in combination with the bit in channel C and thus the indicator light *m* will remain lit unitl the position 2000 is attained. At the position 2000, the manifestation of a bit in the channel B in conjunction with the bit in the channel C will cause all of the lights in the four rightmost columns to be wiped out and will concurrently enable the fourth column of lights from the right which will then have the indicator light *n* lit to correspond to the bit that will be in the channel 2 at the position 2000.

A corresponding analysis of this coding system can be made up to 99,999,999 positions. The display panel 30 shown would only permit an indication of up to 99,999 positions and thus would be used with a tape having only that number of positions. If the tape is to be used with indications to 1/1000 of an inch, the display panel illustrated in FIG. 4 would be for a tape that is encoded for a length of 99.999 inches as a maximum. Obviously, the control panel could be used with shorter tapes.

One important point should be recognized in the use of this coding technique. Since each position on the tape is not uniquely coded, the reading head cannot be placed at any one position and be expected to accurately read from there on in. The reading head must actually be moved back in order to pick up the decimal places which are being held and then moved forward to the point where it is desired to start a reading. For example, in the panel shown where a span of 99 inches may be read to the nearest one thousandth, if the point at which a reading was desired to start happened to be 24.567, the reading head would have to start at the position 20 then move forward to 24.567 to begin reading the desired positions. Thus, the maximum that the reading head would have to be moved back would be 10 inches in the FIG. 4 embodiment illustrated.

Reference has been made herein to a tape coded each 0.001 inch. The increments coded can, however, be as fine as it is possible to code tape. There is nothing in the invention that calls for any particular minimum increment between adjacent bits.

ASSOCIATED LOGIC CIRCUITRY

Figure 6:
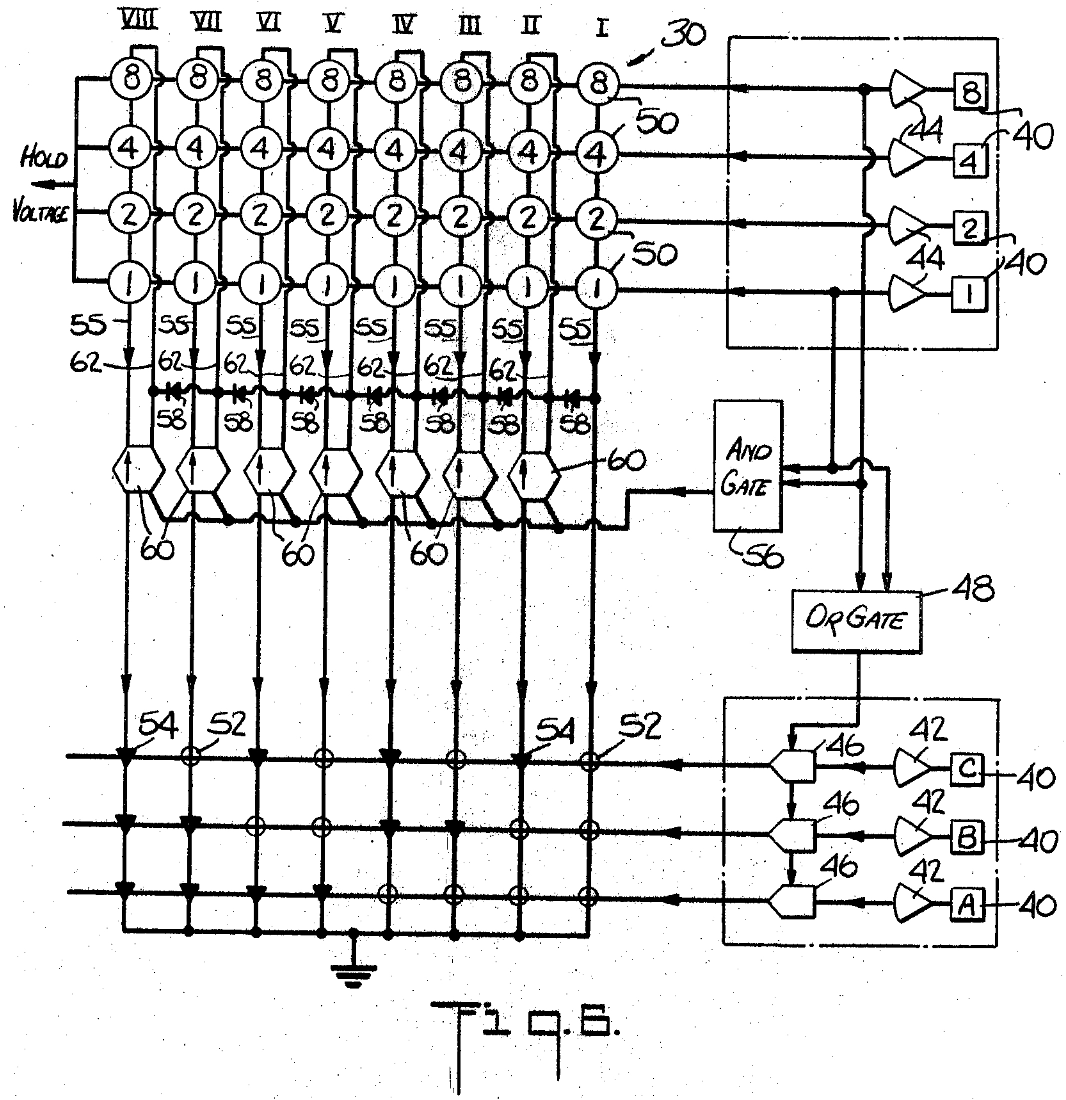
FIG. 6 is a logic diagram of the circuitry employed to provide appropriate reading of a tape encoded with the FIG. 4 BCD code.

FIG. 6 is a logic diagram of the circuitry employed to provide appropriate reading of the tape on which a BCD magnetic code is impressed. The logic functions represented symbolically in FIG. 6 may be mechanized in a number of different ways. However, the mechanization of each logic function is a technique well known in this art and thus is not disclosed herein.

Seven reading heads 40, one for each of the seven channels on the tape, are employed to provide a signal identifiable as to the channel in which it is located when a bit is encoded at any position along the tape. The signals picked up by the three reading heads 40 which are associated with the decimal encoding channels (A, B and C) are amplified by amplifiers 42. The signals picked up by the four heads 40 associated with the four digit channels (1, 2, 4 and 8) are similarly amplified by amplifiers 44 with the distinction that the amplifiers 44 include time delay circuits so that the amplifier 44 outputs lag behind the amplifier 42 outputs by a predetermined amount. This relative lag is built into the amplifiers 44 so that the memory devices 46 will not be prematurely reset by a signal through the "OR" gate 48 prior to the completion of the desired operations, which operations are in response to signals put out by the amplifiers 42.

Amplified impulses from the digit channels 8, 4, 2, and 1 are fed to the display bank 30 which consists of a matrix of thirty-two indicator circuits 50. In this fashion a particular digit (from 1 to 9) which is read by the digit heads 8, 4, 2 and 1 is fed to the indicator circuits 50 to be displayed along the appropriate column I, II, . . . VIII.

The particular column (vertical line) of indicator circuits 50 which will be triggered by the pulses from the binary coded channels 8, 4, 2 and 1 is determined by the state of the switches 52, 54. The switches 52, 54 are shown in their normal state with the normally open switches 54 differentiated from the normally closed switches 52. When a signal is received from any one of the memory devices 46, all of the switches in the corresponding channels A, B or C are changed in state. In the condition shown where there is no signal from any one of the memory devices 46, the only column in which three switches are closed is I. Thus column I alone is grounded and a bias is applied (through the appropriate one of the conductors 55) to the four indicator circuits 50 in column I allowing only these four indicator circuits to be triggered by impulses from the channels 8, 4, 2 and 1. In this fashion, signals from the decimal channels A, B, C will change the state of the switches in the corresponding switch 52, 54 channels such that the appropriate column of indicator circuits 50 will be enabled to be triggered by impulses from the binary channels 8, 4, 2 and 1. As may be seen from observation and trial and error inspection, the three switches 52, 54 in only one column at a time can be simultaneously closed. The arrangement of normally open switches 54 and normally closed switches 52 is set such that the particular column of switches which is closed corresponds to the coding on the decimal A, B and C. The channels A, B and C are coded (in binary style) to designate the decimal position of the digit being read in the channels 8, 4, 2 and 1. Thus the line of switches 52, 54 that are all closed act as a decimal indicator for the indicator circuit 50 matrix.

The memory circuits 46 are reset through the "OR" gate 48 whenever there is a bit in either the 1 or the 8 channel but not when there is a bit in both the 1 and 8 channels; thus the "OR" gate 48 is an exclusive OR gate. Once every ten digits there is at least one bit (signal) from the decimal channels A, B, C. Thus once every ten digits the memory device 46 is effective to switch the state of the appropriate switches 52, 54 and thereby enable the appropriate decimal column. On ascending readings, movement to the next digit past the "tens" unit will result in a signal from the 1 channel which will be passed by the "exclusive OR" gate 48 to reset the memory devices 46. On descending readings, movement of the reading heads past the "nines" unit will provide a signal from the 8 channel which will be passed by the OR gate 48 to reset the memory devices 46. With the memory devices 46 reset, the switches 52, 54 are returned to the normal state shown in FIG. 6 and the succeeding units (until the next tens unit) will be indicated by the indicator circuits 50 in column I.

The description of the FIG. 6 logic diagram thus far shows how signals in the decimal channels A, B, C are employed to enable the appropriate column of indicator circuits 50 so that the corresponding signals from the digit channels 8, 4, 2, 1 will be read into the appropriate column (I through VIII) and thus give an appropriate decimal indication once every ten units. In addition, it has been shown that the arrangement of switches 52 and 54 is such that the nine units between every tenth unit are read on column I. All that is needed to complete the logic diagram is a technique for making sure that the reading from the 8, 4, 2 and 1 channels is indicated solely on the correct column of indicator circuits 50 when there is a concurrent signal from the A, B, C channels. Just as the OR gate 48 serves to make sure that only column I is enabled during the nine digits between every ten digits, the coincidence gate 56 makes sure that the diodes 58 and subtraction circuits 60 are enabled at the appropriate reading positions to in turn disenable all but the desired line of indicator circuits 50 to every tenth digit.

In moving along the encoded tape in a descending direction (for example from position 6000 to position 5999) the diodes 58 and subtraction circuits 60 are required to change the "6" to a "5" and all of the zeros to nines. As has been pointed out above, whenever the conductor 55 to any one column of indicator circuits 50 is grounded (through the switches 52, 54) that column will be made responsive to the signals from the 8, 4, 2, 1 channels. Each of the columns II through VIII of indicator circuits 50 also include counting circuits which will count down one unit whenever a ground is applied to the corresponding conductor 62.

The subtraction circuit 60 is an electronic switch which is activated by an output from the AND gate 56. The AND gate 56 will have an output when both the 8 and 1 reading heads 40 simultaneously pick up a bit. When the reading heads 40 have moved from the position 6000 to the position 5999, the reading heads 40 will be over a bit in the 8 channel and a bit in the 1 channel so that the AND gate 56 is enabled. However, the OR gate 48 will not be enabled until the head moves to the position 5998 and thus the memory circuits 46 are not yet reset. Thus, because the memory circuits 46 have not been reset, column IV of indicator circuits 50 is grounded (the last reading having been the reading 6000 which resulted in the closing of the three switches 52, 54 in column IV). Each subtraction circuit 60 is designed so that whenever there is a coincidence between the grounding of the corresponding conductor 55 and the incidence of an output from the AND gate 56, the particular circuit 60 will ground the corresponding conductor 62.

Thus the subtraction circuit 60 in column IV causes the conductor 62 in column IV to become grounded. The biases are such that the diodes 58 then also provide a path to ground for the conductor 62 in columns II and III as well as for the conductor 55 in column I. As a consequence, the indicator circuits 50 in column IV count down from 6 to 5, the indicator circuits 50 in columns II and III count down from 0 to 9 and the indicator circuits in column I read a "9" directly from the amplifiers 44 in channels 8 and 1.

On the next descending movement of the reading heads 40 (which is a movement from 5999 to 5998) the OR gate 48 is activated and a signal passes to reset the memory circuits 46. At the same time the AND gate 56 becomes disenabled and, as a consequence, the subtraction circuits 60 are no longer operative to ground the conductors 62.

It might also be noted that if, instead of continuing in a descending order from 5999 to 5998, the reading heads 40 moved from 5999 back to 6000, the subtraction circuits 60 would become disenabled because of the disenabling of the AND gate 56 so that a 6 would be read directly into column IV and the columns III, II and I (which are all the columns to the right of column IV) will be blanked out.

One embodiment of this invention has been described in sufficient detail to allow one skilled in this art to design an operable embodiment of the invention. However, it should be understood that many variations may be made in the embodiment described without departing from the true scope of this invention.

For example, there is no inherent reason why the precision of the position measuring device should be limited to one-one thousandth of an inch. The limitation on precision is the practical limitation on how closely together succeeding bits can be coded on magnetic tape. Similarly, the number of channels coded on the tape may be varied where it is desired to encode either fewer or more positions.

The reading head 26, 28 has not been described in detail and has been "logically" presented in FIG. 6 as seven reading heads 40. It should be understood that the heads must read in stationary mode and thus will be of the type where a high frequency (100 kc.) signal is passed through the head and is modulated by the presence of a magnetic bit. Such heads are available in the art. For example, the BK4508 flux responsive magnetic head available from Brush Instruments will serve as a satisfactory reading head for this purpose.

The coding of the tape has been described as one where a bit is either encoded (marked as a plus in FIG. 4) or left out at each incremental position of each channel. Actually, the lack of a so-called "bit" is in itself a piece of information and in a broad sense may be referred to as a bit of information. Accordingly, it would be equally possible to encode the tape by having the plus bits represented by magnetized areas which are polarized in a first direction and having the blank or minus bits as areas which are magnetized so as to be polarized in a separate direction. The heads would then provide signals whose polarity could be read by the logic circuitry so as to obtain the required information. All that counts as far as the coding technique is concerned is that it be a code having two distinguishable types of bits and that the pick-up circuitry be designed to distinguish between the particular types of bits which are encoded on the magnetic tape.

The phrase "BCD code" as used herein should be understood to refer to the particular code shown in FIG. 4. It is this particular code which makes it feasible to use magnetic tape to obtain the reading of a large number of closely spaced increments.

Although the tape has been described as used on a working surface whereon a chart may be laid out, it should be understood that the tape, appropriately coded with a BCD code, could be laid out on a working surface on a milling machine to control the machine or to record in digital form a milling operation that can then be automatically repeated, through tape control, at a later time. Known circuitry could be added to automatically record X, Y positional information on punch cards, paper tape or magnetic tape, and the system could provide positional information to an automatic data plotting system.

Accordingly, the following claims are not limited to the embodiment disclosed but are directed to the full scope of the invention.

What is claimed is:

1. A position indicating scale comprising an elongate element longitudinally encoded at regular intervals with sensible indicia to numerically indicate position along its length:

(a) said indicia being arranged in a plurality of at least six longitudinal channels on said elongate element;

(b) said indicia in four of said channels being in blocks of ten interval positions, each of nine of said ten positions within each of said blocks being encoded in binary notation to indicate the units digit for the decimal numeral for said each position, the digit encoded in binary notation across said four channels at the remaining one of said ten positions being that digit value to which the most significant changing digit of said numeral is increased on ascending movement from the preceding interval position on said scale; and (c) the remaining channels of said plurality being encoded in binary notation across said channels at each of said remaining one of said ten positions to indicate the power to the base ten of said digit encoded by said four channels at said remaining position.

2. A position measuring device comprising:
a position indicating scale according to claim 1; and
reading head means to provide signals indicating the coding on said scale thereby providing a position reading along said scale.

3. A position measuring device comprising:
a working surface having a first axis;
a scale according to claim 1 fixedly mounted to said working surface and deployed along a path parallel to said first axis; thereby defining a scale path; and
means for reading the encoding along said scale path.

4. A position measuring device comprising:
a working surface having a first axis and a second axis;
a first position indicating scale according to claim 1 fixedly mounted relative to said working surface parallel to said first axis of said working surface;
a first carriage mounted to move parallel to said first axis;
a first reading head mounted on said first carriage and deployed facing said first scale to read the code on said scale;
a second carriage mounted on said first carriage and free to move relative to said first carriage in a direction parallel to said second axis;
a second position indicating scale according to claim 1 fixedly mounted on said first carriage to define a second scale path parallel to said second axis;

a second reading head mounted on said second carriage and deployed facing said second scale to read the code on said second scale; and stylus means connected to said second carriage to per mit following a desired path on said working surface, whereby the movement of said stylus will move said carriages and said reading heads so that the position code read by said first head on said first scale will give an indication of the position of said stylus along said first axis and the position code read by said second head on said second scale will give the position of said stylus along said second axis.

5. A magnetic tape magnetically encoded in increments along its length to indicate position along its length, said tape being encoded in seven channels, said tape having:

(a) four of said seven channels encoded in blocks of ten incremental positions, nine of said ten positions within each of said blocks being encoded in binary fashion to indicate the units digit for the decimal numeral for said position, the decimal digit encoded by said four channels at each of said tenth positions being that decimal digit, other than the units digit, which is changed on ascending movement from the preceding incremental position;

(b) the other three of said seven channels being encoded only at those positions corresponding to said tenth positions in each of said tenth position blocks, said other three channels being encoded at each one of said tenth positions to indicate the power to the base ten of the decimal digit encoded by said four channels at said tenth position.

6. A magnetic tape magnetically encoded in increments along its length to indicate position along its length, said tape being encoded in seven channels, said tape having:

(a) four of said seven channels encoded in blocks of ten incremental positions, nine of said ten positions within each of said blocks being encoded in binary fashion to indicate the units digit for the decimal numeral for said position; a decimal digit being encoded in binary fashion by said four channels at each of said tenth positions being that decimal digit, other than the units digit, which is changed on ascending movement from the preceding incremental position;

(b) the other three of said seven channels being encoded only at those positions corresponding to said tenth positions in each of said tenth position blocks, said other three channels being encoded in binary fashion at each one of said tenth positions to indicate the power to the base ten of said decimal digit encoded by said four channels at said tenth position.

7. A magnetic tape magnetically encoded in increments along its length to indicate position along its length, said tape being encoded in a plurality of at least six channels, said tape having:

(a) four of said plurality of channels encoded in blocks of ten incremental positions, nine of said ten positions within each of said blocks being encoded in binary fashion to indicate the units digit for the decimal numeral for said position, the decimal digit encoded by said four channels at each of the tenth of said positions being that decimal digit, other than the units digit, which is changed on ascending movement from the preceding incremental position;

(b) the remaining channels of said plurality of channels being encoded at each one of said tenth positions to indicate the power to the base ten of the decimal digit encoded by said four channels at said tenth position.

8. A measuring device comprising:

a working surface having a first axis;

a magnetic tape according to claim 7 fixedly mounted relative to said surface and deployed parallel to said first axis; and a magnetic reading head spaced from said tape and mounted free to move along the length of said tape to provide a coded signal indicating the position of said reading head along said first axis.

9. A position measuring device comprising:

a working surface having a first axis;

a magnetic tape according to claim 7 fixedly mounted relative to said working surface and parallel to said first axis of said working surface;

a carriage mounted to move parallel to said first axis; and a reading head mounted on said carriage and deployed facing said magnetic tape to read the magnetic code on said tape.

10. A position measuring device comprising:

a working surface having a first axis and a second axis;

a first magnetic tape according to claim 7 fixedly mounted relative to said working surface parallel to said first axis of said working surface;

a first carriage mounted to move parallel to said first axis;

a first reading head mounted on said first carriage and deployed facing said first magnetic tape to read the magnetic code on said tape;

a second carriage mounted on said first carriage and free to move relative to said first carriage in a direction parallel to said second axis;

a second magnetic tape according to claim 10 fixedly mounted on said first carriage to define a second scale path parallel to said second axis;

a second reading head mounted on said second carriage and deployed facing said second magnetic tape to read the magnetic code on said second magnetic tape; and stylus means connected to said second carriage to permit following a desired path on said working surface;

whereby the movement of said stylus will move said carriages and said magnetic heads so that the position code read by said first head on said first tape will give an indication of the position of said stylus along said first axis and the position code read by said second head on said second tape will give the position of said stylus along said second axis.

References Cited

UNITED STATES PATENTS

| | | | |
|---|---|---|---|
| 2,914,756 | 11/1959 | Heidenhain et al. | |
| 3,346,960 | 10/1967 | Miles. | |
| 2,705,105 | 3/1955 | Paschen | 346—50 X |
| 2,755,162 | 7/1956 | Krahulec et al. | 346—37 |
| 3,022,501 | 2/1962 | Seigle | 178—18 X |

OTHER REFERENCES

Kliever-Control Engineering, November 1955, pp. 77–80.

MAYNARD R. WILBUR, Primary Examiner

MICHAEL K. WOLENSKY, Assistant Examiner

U.S. Cl. X.R.

178—113; 340—347